Sept. 26, 1967    D. WHITTAKER    3,343,883
ROTARY CUTTER UNITS FOR LONGWALL
MINERAL MINING MACHINES
Filed June 11, 1965    3 Sheets-Sheet 1

Inventor
Donald Whittaker
By Stevens, Davis, Miller & Mosher
Attorneys

Sept. 26, 1967  D. WHITTAKER  3,343,883
ROTARY CUTTER UNITS FOR LONGWALL
MINERAL MINING MACHINES
Filed June 11, 1965  3 Sheets-Sheet 2

Inventor
Donald Whittaker
By Stevens, Davis, Miller & Mosher
Attorneys

Sept. 26, 1967     D. WHITTAKER     3,343,883
ROTARY CUTTER UNITS FOR LONGWALL
MINERAL MINING MACHINES
Filed June 11, 1965     3 Sheets-Sheet 3

Inventor
Donald Whittaker

By Stevens, Davis, Miller & Mosher
Attorneys

3,343,883
ROTARY CUTTER UNITS FOR LONGWALL MINERAL MINING MACHINES
Donald Whittaker, Bromley, Kent, England, assignor to Coal Industry (Patents) Limited, London, England, a company of Great Britain
Filed June 11, 1965, Ser. No. 463,133
5 Claims. (Cl. 299—89)

ABSTRACT OF THE DISCLOSURE

A mining machine cutter unit comprising three helical cut mineral guides projecting from a cylindrical drum and spiraling for less than a complete drum turn to steer cut mineral from the mineral face by scroll action, and tool holders on the guides defining two interlaced helical tool cutting patterns having helix directions opposite to the guide helices whereby each tool cuts from a free face.

---

This invention relates to rotary cutter units for mineral mining machines and in particular to machines for longwall mineral mining.

One of the most successful power-loading longwall coal mining machines is the drum shearer type which has a cutter unit in the form of a drum, or several co-axial cutter discs, rotating about an axis perpendicular or nearly perpendicular to the mineral face, and this drum is normally provided with twenty or more cutter tools such as picks on its curved surface. The rotary cutter unit is mounted on a machine body which rides on a face conveyor.

It is an object of the present invention to provide a rotary cutter unit for a longwall mineral mining machine which is an improvement over known units.

According to the invention, a rotary cutter unit of generally cylindrical form and for a mineral mining machine, comprises continuous mineral guide means helically arranged in such a hand when in operation as to direct cut mineral by a scroll action away from the mineral face, and a series of cutter tool holding devices mounted on said guide means located in such positions as to form a cutting helix of the reverse hand to the hand of the guide means. With this arrangement the cutter tools are caused to strike the mineral to be mined in an order which travels across the drum towards the mineral face.

Conveniently the mineral guide means can be an assembly of plates arranged to form a spiral vane drum configuration. Preferably the plates are arranged to form three separate spirals.

According to a further aspect of the present invention, a rotary cutter unit for a longwall mineral mining machine comprises a framework adapted to support fewer than fifteen holders for cutting picks, said holders being located so that the picks are located on the curved surface of a cylinder, and said holders being arranged in the form of one or more helices.

By using less than fifteen picks the improvement over known units in respect of power consumption for a given rate of advance, size of coal produced, liberation and dispersion of dust, and liberation of methane is obtained. When using less than fifteen picks they can be more widely-spaced on the rotary cutter unit. Furthermore the pick penetration can be correspondingly increased by reducing the speed of rotation of the cutter unit or increasing the speed of haulage or both.

In either of the above arrangements, the pick holding devices are so disposed on the curved surface of the cylinder so that, in operation, the first pick to cut is that on the machine side of the web of coal or other mineral to be removed from the face rather than that at the rear of this web.

Advantageously, the rotary cutter unit according to the present invention is used in combination with a special design of cutter pick having a breadth in frontal aspect several times greater than conventional cutter picks, for example, the picks referred to may be from 1 inch to 3 inches wide and of spade or generally rectangular form seen in front elevation.

Further features of the invention will appear from the following specific description of an illustrative embodiment, given with reference to the accompanying diagrammatic drawings in which.

Figure 1:
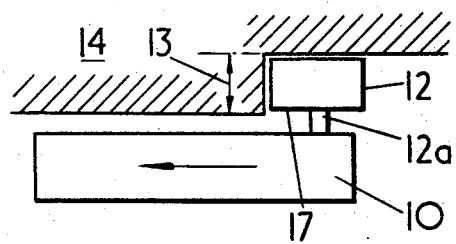
FIGURE 1 is a plan view of the cutter loader mining machine and coal face.
Figure 2:
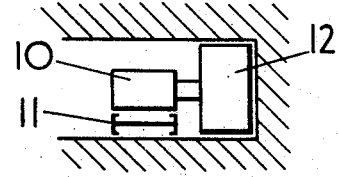
FIGURE 2 is an end elevation of the machine shown in FIGURE 1.
Figure 3:
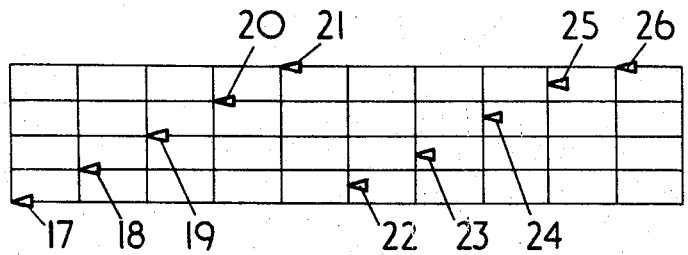
FIGURE 3 shows the pick lacing pattern on the cylindrical curved surface of the rotary cutter unit of the mining machine.

Referring to FIGURES 1–3, the machine of the well-known drum shearer type has a body 10 which rides on an armoured face conveyor 11 and includes a rotary cutter unit 12 adapted to cut a web of thickness 13 from a coal face 14. The axis of rotation of the rotary cutter unit is shown at 12a and is approximately perpendicular to the longitudinal direction of travel of the machine shown by the arrow. The rotary cutter unit 12, which may be in the form of a cylindrical drum, or a number of discs, or a number of plates of sector shape built up so as to provide the required support for the pick holders, carries a number of no more than fifteen pick holders, the preferred number lying in a range of 8 to 15 picks, each holder being adapted to receive one pick, shown as 17 to 26 in FIGURE 3. The ratio between the width of a pick and the center-to-center spacing between adjacent picks, along the axis of the cutter unit, is preferably 1 to 3. The arrangement of these picks on the actual or hypothetical cylindrical curved surface of the rotary cutter unit is in the form of two helices, and is such that pick 17, cutting into the web nearest to the machine contacts the coal to be cut before pick 21, cutting into the web at the rear or side furthest from the machine. It is a feature of the invention that the picks, and correspondingly, of course, the pick holders, ten picks being shown in FIGURE 3 of the drawings, are arranged in the form of two helices, picks 17–21 forming one helix and picks 22–26 forming a second helix. The picks 22–25 are disposed laterally so that they strike the coal at points intermediate between the points at which the picks 17–21 strike it. The rotary cutter unit as shown rotates in the direction in which the picks cut from roof to floor of the mineral seam, though in certain circumstances it may be desirable for the rotation to be in the reverse direction.

Figures 4, 5:
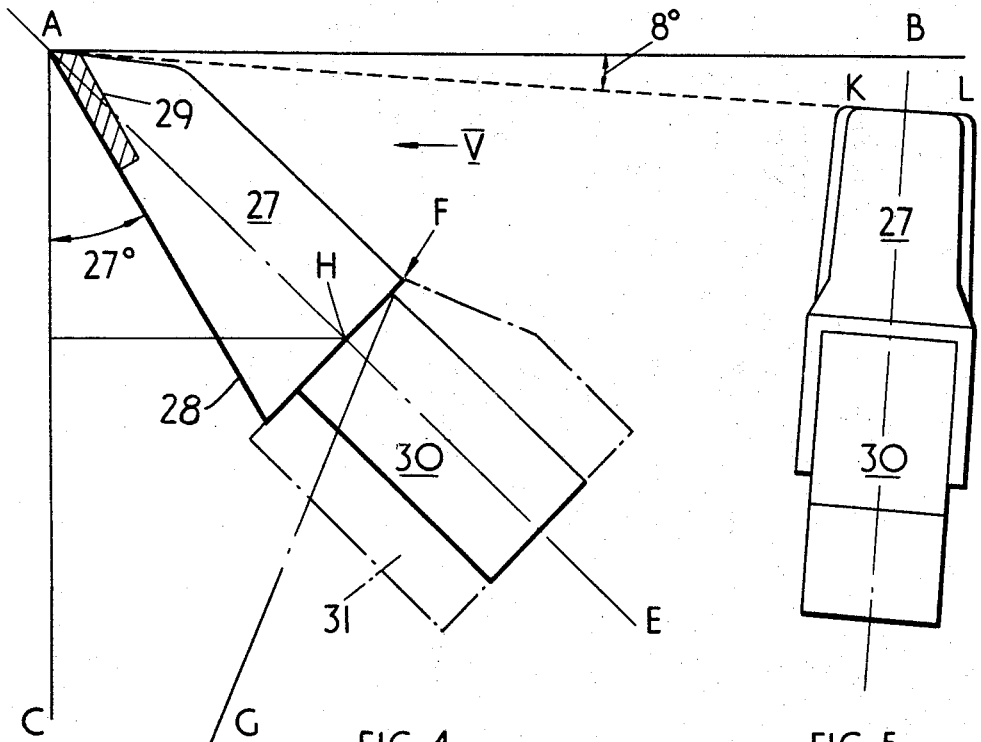
FIGURE 4 is a side elevation of a cutter pick suitable for use with the rotary cutter unit according to the invention.
FIGURE 5 is a view, in the direction V in FIGURE 4 of the pick shown in FIGURE 4 and on the same scale as FIGURE 4.

Referring now to FIGURES 4 and 5, the design of cutter pick preferable for use on the rotary cutter unit according to the invention has a main body 27 with a flat front face 28 and a tungsten carbide insert 29 at the tip. The body 27 has a shank 30 which is mounted in a pick box or pick-holding device 31. The preferred geometrical arrangement of the pick and pick-holding device is shown in FIGURE 4, in which the line AC and GF are radii passing through the axis of rotation of the rotary cutter unit, AB is the tangent to the radius AC, and AE is the axis of the pick shank 30. The pick has a rake angle which can be within the range 20 to 30°. Preferably the angle is 27°. The back clearance angle has a range of 8 to 10° and is preferably 8°, and the preferred pick size is such that the dimension AH is 6 in., and the dimension KL (FIGURE 5) is 2 inches.

Figure 6:
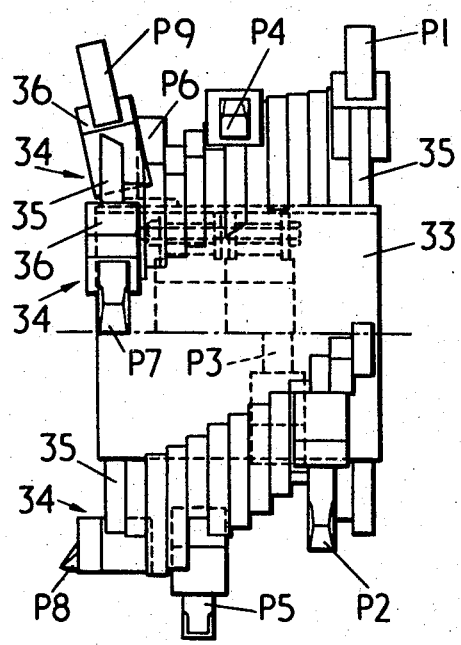
FIGURE 6 is a schematic side view of a second embodiment of spiral vane shearer drum.
Figure 7:
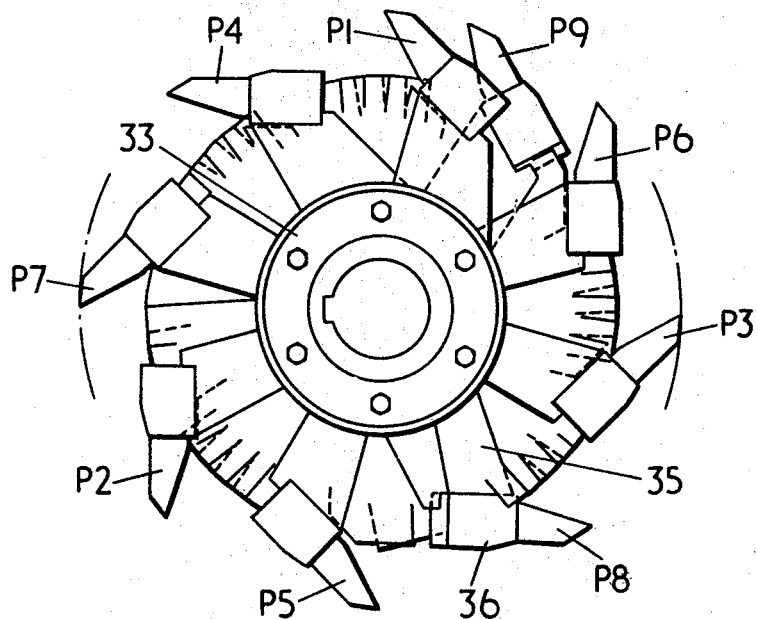
FIGURE 7 is an end view of the drum of FIGURE 6.

The drum of FIGURES 6 and 7 includes a cylindrical central core 33 which is adapted for mounting upon a drive shaft (not shown). Three sets 34 of radially extending plates 35 are mounted on the core 33. The plates 35 of each set form a continuous spiral or scroll 37 (FIG. 8) extending across the core 33. Certain of the plates 35 in each set are adapted to carry a pick holder 36. In the drawings there are three pick holders 36 to each set.

The drum is provided with nine pick holders, each of which is provided with a pick, the picks being identified as P1, P2, P3, P4, P5, P6, P7, P8 and P9. The picks P1 and P8 are picks which are included in the pick helices. The pick P9 is a clearance pick which is additional to those forming part of the helices. The picks P8 and P9 are slightly angled with respect to the end face of the drum so that they project outwardly from this end face, the latter being nearest to the mineral face in use.

The picks are arranged to form two separate helices of picks. A first helix includes picks P1, P3, P5 and P7, and a second helix includes picks P2, P4, P6 and P8. The order in which the picks of the first helix strike the face is P1, P3, P5 and then P7, and the order in which the picks of the second helix strike the face is P2, P4, P6 and then P8, the direction of travel being as shown by the arrow T and the drum rotation anticlockwise looking from the machine towards the face. In will be seen, particularly from FIGURE 9, that the first and second helix commence to attack the mineral before the picks of the first helix have completed their cutting sequence.

Figure 9:
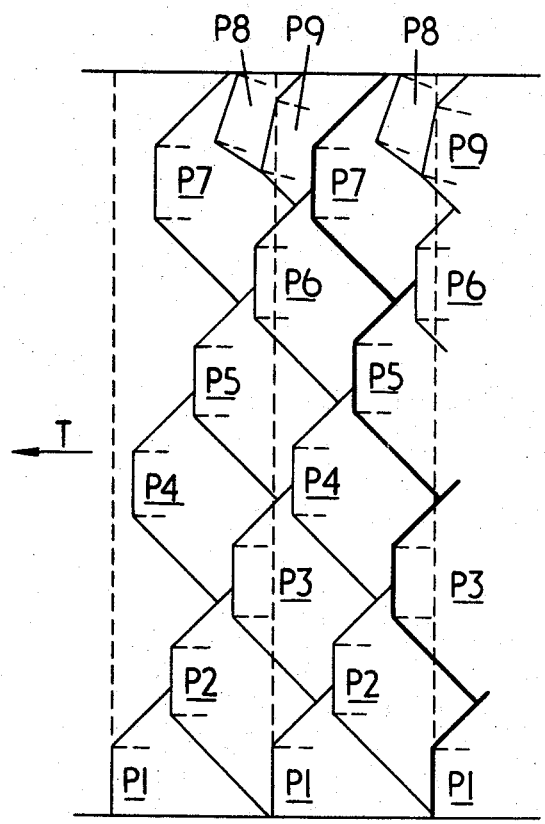
FIGURE 9 schematically illustrates the pattern of mineral breakage at mid seam level.

FIGURE 9 schematically illustrates the pattern of coal breakage at mid level of the face 14. The direction of machine travel is illustrated by arrow T. The lowermost part of the drawing is the portion of the seam nearest to the machine. The areas of the seam cut out by the picks are numbered to agree with the numbering of the pick which effected the cut-out.

Figure 8:
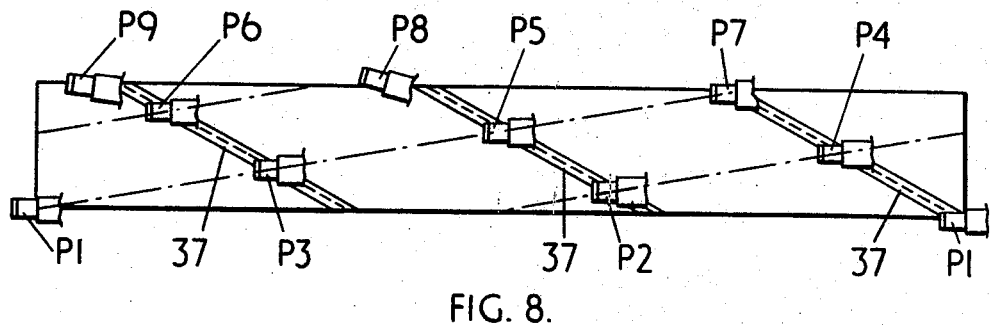
FIGURE 8 is a schematic representation of a developed surface of the drum of FIGURES 6 and 7.

In FIGURE 8 the chain-dashed lines joining the picks P1, P3, P5 and P7, and the picks P2, P4 and P6 and P8 represent the helices of the picks, and the full lines schematically represent the scrolls 37 consisting of the plates 35. The scrolls 35 deflect the cut mineral in the direction from the face end of the drum towards the machine end of the drum. The cutting action of the picks is in the reverse direction or hand to that of the scrolls and runs from the machine end of the drum to the face end of the drum.

In a further arrangement of the pick holders the pick holders 36 are arranged to form a single helix which is of the opposite hand to the scrolls 37.

The fact that the two patterns of picks are laterally dispaced in practice leads to a good clearance at the roof and floor of the mineral seam. Furthermore by overlapping the two pick patterns it is possible to obtain an improvement in the balance of the forces produced in the drum and its supporting shaft when in use.

Since the helical guides are relatively steeply angled to the axis of the drum as efficient clearance of mined mineral is obtained as the mineral is thrown clear directly onto the conveyor.

In use to obtain the optimum cutting conditions for the drum with the small number of large picks it is necessary to ensure that the pick penetration per revolution is quite large for example from 2″ to 8″ or higher, then preferred lengths being 4″ to 6″. The relation between the machine haulage speed and the drum revolutions determines the penetration per revolution.

The following table illustrates several acceptable ratios which are equivalent to the depth of penetration in inches.

| Revolution of the cutter unit per minute | Haulage speed in feet per minute | Ratio Pick penetration in inches |
|---|---|---|
| 90 | 30 | 4 |
| 60 | 20 | 4 |
| 48 | 16 | 4 |
| 60 | 30 | 6 |
| 40 | 20 | 6 |

The ratios possible are mainly governed by the haulage speed available.

I claim:
1. A rotatable cutter unit for a mineral mining machine adapted for traveling along a cut-mineral conveyor means arranged lengthwise of a mineral face to be mined and having a rotatable drive means for the cutter unit, the cutter unit comprising a cylindrical drum adapted for mounting on said drive means for rotation about its longitudinal axis; more than one helical guide means for cut mineral equiangularly spaced around the longitudinal axis of the drum, each said guide means extending from one end of the drum to the other end of the drum and spiraling over the drum surface for less than a complete turn of the drum surface in such sense as to direct cut mineral by scroll action away from the mineral face being mined; and a series of mineral cutter tool holders so positioned with respect to the guide means as to define two interlaced tool cutting helices each of the reverse hand to the hand of the guide means.

2. A rotatable cutter unit for a mineral mining machine adapted for traveling along a cut-mineral conveyor means arranged lengthwise of a mineral face to be mined and having a rotatable drive means for the cutter unit, the cutter unit comprising a cylindrical drum adapted for mounting on said drive means for rotation about its longitudinal axis; at least three helical guide means for cut mineral extending from one end of the drum to the other end of the drum, each guide means spiraling over the drum surface for less than one half of a complete turn of the drum surface in such sense as to direct cut mineral by scroll action away from the mineral face being mined, and two series of mineral cutter tool holders so positioned with respect to each guide means as to define two interlaced cutting helices of the reverse hand to the hand of the guide means.

3. A rotatable cutter unit as claimed in claim 2, wherein the number of tool holders is from eight to fifteen.

4. A rotatable cutter unit as claimed in claim 2, wherein the ratio between the length of cutting edge of a tool adapted for mounting in the tool holders and the center-to-center spacing of successive tool holders in a cutting helix is 1 to 3.

5. A rotatable cutter unit as claimed in claim 2, wherein each guide means comprises an assembly of flat plates arranged in a side-by-side stepped formation.

References Cited

UNITED STATES PATENTS

| 143,535 | 10/1873 | Sheldon | 175—394 |
| 482,033 | 9/1892 | Atkinson et al. | 299—87 X |
| 1,084,871 | 1/1914 | Tuck | 299—87 |
| 2,758,826 | 8/1956 | Paget | 299—87 X |

FOREIGN PATENTS

| 23,036 | 2/1906 | Austria. |
| 615,512 | 1/1927 | France. |

ERNEST R. PURSER, *Primary Examiner.*